(12) United States Patent
Narayanaswamy et al.

(10) Patent No.: US 6,886,074 B1
(45) Date of Patent: Apr. 26, 2005

(54) METHOD AND APPARATUS FOR RAID LOAD BALANCING

(75) Inventors: Manjunath Narayanaswamy, Sunnyvale, CA (US); Madhuresh Nagshain, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 234 days.

(21) Appl. No.: 10/010,846

(22) Filed: Dec. 5, 2001

(51) Int. Cl.[7] ............................................. G06F 12/00
(52) U.S. Cl. ................... 711/114; 711/112; 718/102; 718/103; 718/605; 709/201; 709/223; 709/226
(58) Field of Search ............................. 711/112, 114; 718/102, 103, 105; 709/201, 223, 226

(56) References Cited

U.S. PATENT DOCUMENTS

| | | | | |
|---|---|---|---|---|
| 6,145,028 A | * | 11/2000 | Shank et al. | .................. 710/31 |
| 6,189,065 B1 | * | 2/2001 | Arndt et al. | ................ 710/260 |
| 6,415,328 B1 | * | 7/2002 | Korst | .......................... 709/232 |
| 6,415,372 B1 | * | 7/2002 | Zakai et al. | ................ 711/165 |
| 6,421,317 B1 | * | 7/2002 | Denecheau et al. | ......... 370/222 |
| 6,430,618 B1 | * | 8/2002 | Karger et al. | ............... 709/225 |
| 6,438,595 B1 | * | 8/2002 | Blumenau et al. | .......... 709/226 |
| 6,560,717 B1 | * | 5/2003 | Scott et al. | ..................... 714/4 |
| 6,578,068 B1 | * | 6/2003 | Bowman-Amuah | ......... 709/203 |
| 6,651,082 B1 | * | 11/2003 | Kawase et al. | ............. 718/105 |

OTHER PUBLICATIONS

Jai Menon, Jeff Riegel, Jim Wyllie Software/hardware RAIDs 1063–6390/ IEEE 1995.*

* cited by examiner

*Primary Examiner*—Donald Sparks
*Assistant Examiner*—Ngoc V Dinh
(74) *Attorney, Agent, or Firm*—Martine, Penilla & Gencarella, LLP (57) ABSTRACT

Methods and an apparatus for RAID load balancing are provided. One exemplary method includes establishing first and second counters where the first counter is associated with a first drive and the second counter is associated with a second drive. Next, a command is received form an operating system. Then, it is determined if the received command is a read command. If the received command is a read command, then the counters are examined to determine which of the counters is a lower value counter or if the counters are of equal value. Next, a drive associated with the lower value counter is selected or if the counters are of equal value a first drive is selected. The lower value counter is then incremented. Then, the read command is directed to the drive associated with the lower value counter or the first drive if the counters are of equal value.

22 Claims, 5 Drawing Sheets

METHOD AND APPARATUS FOR RAID LOAD BALANCING

BACKGROUND OF THE INVENTION

1. Field of the Invention

This invention relates generally to methods and apparatus for improving computer performance and more specifically to improving the distribution of read requests to multiple storage media of a redundant array of inexpensive disks (RAID) system.

2. Description of the Related Art

The operating system (OS) of a computer controls the delivery of read requests to a storage medium. For example, in the case of a RAID mirroring implementation, where multiple storage disks are employed, the OS will send the read requests to the queue of a primary drive until that drive is full. When the queue of the primary drive is full, the read requests are held until the queue for the primary drive is decreased. Therefore, the OS is forced to wait until the primary drive processes read commands to free up capacity in the queue.

Figure 1:
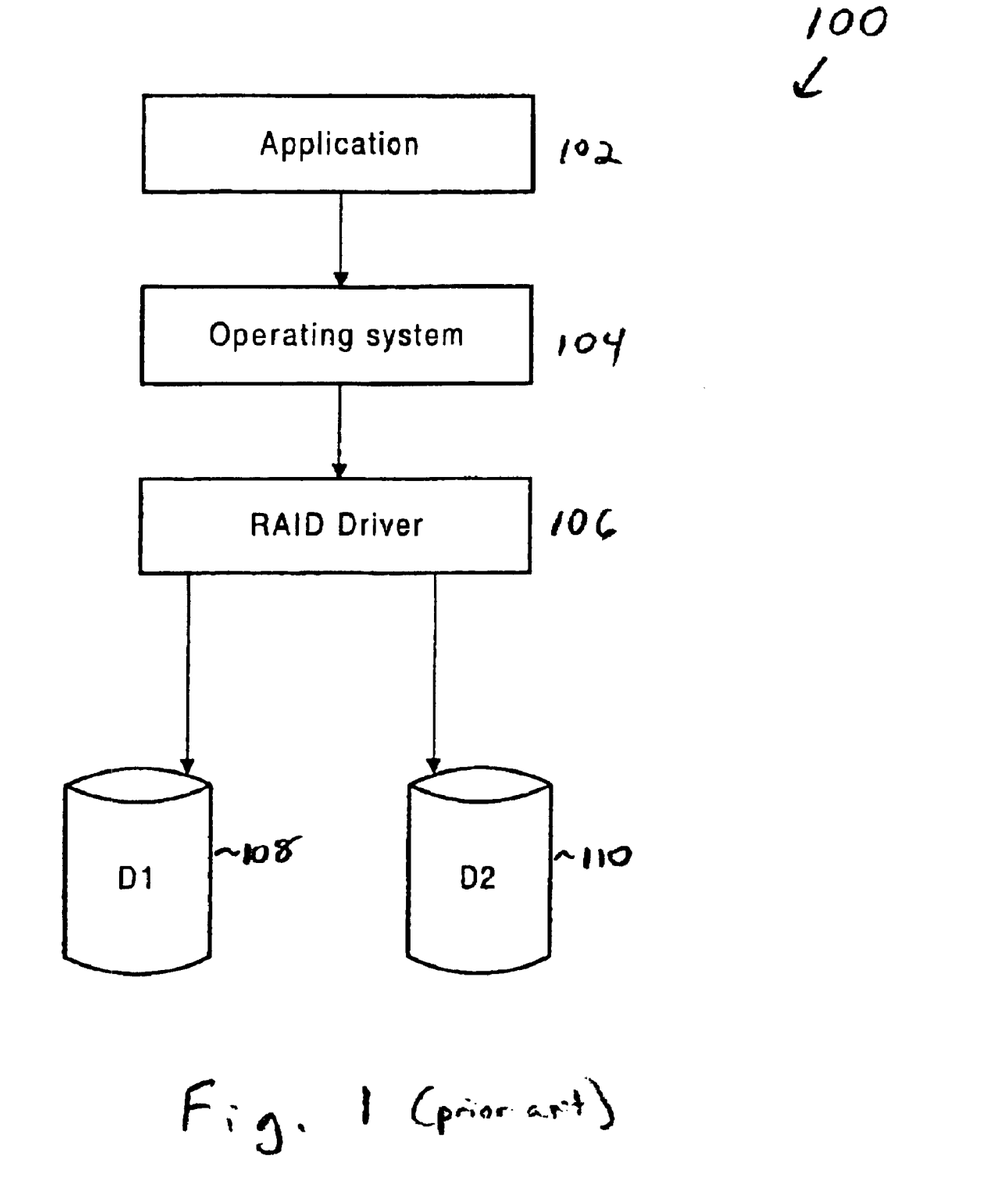
FIG. 1 illustrates a block diagram depicting how read commands are handled in the prior art for a software redundant array of inexpensive disks (RAID) implementation.

FIG. 1 illustrates block diagram 100 depicting how read-commands are handled in the prior art for a software redundant array of inexpensive disks (RAID) implementation. An application 102 requires data and notifies the operating system (OS) 104. The operating system 104 issues a read command to a RAID driver 106. In the case of RAID level 1 (mirroring), the read commands are sent to the primary drive D1 108 from the RAID driver 106. As more read commands are issued from the operating system 104, the read commands are queued for the primary drive D1 108. For example, the drive D1 108 has a random access memory (RAM) in which tagged command queing is performed. The read commands continue to accumulate until the queue for D1 108 reaches a full level. While the drive D1 108 can theoretically queue up to 256 commands, typically the drive issues a queue full message to stop sending additional read commands after 16, 32 or 64 commands have been queued. When the drive D1 108 issues a queue full message, the read commands are held until the drive D1 108 sends a response that a read command has been processed. Since the drive is much slower than the CPU, because of the physical limitations of the mechanical activity of the drive, the drive becomes the main bottleneck. The OS is continually issuing more commands, but the primary disk is unable to provide the desired throughput.

Figure 2:
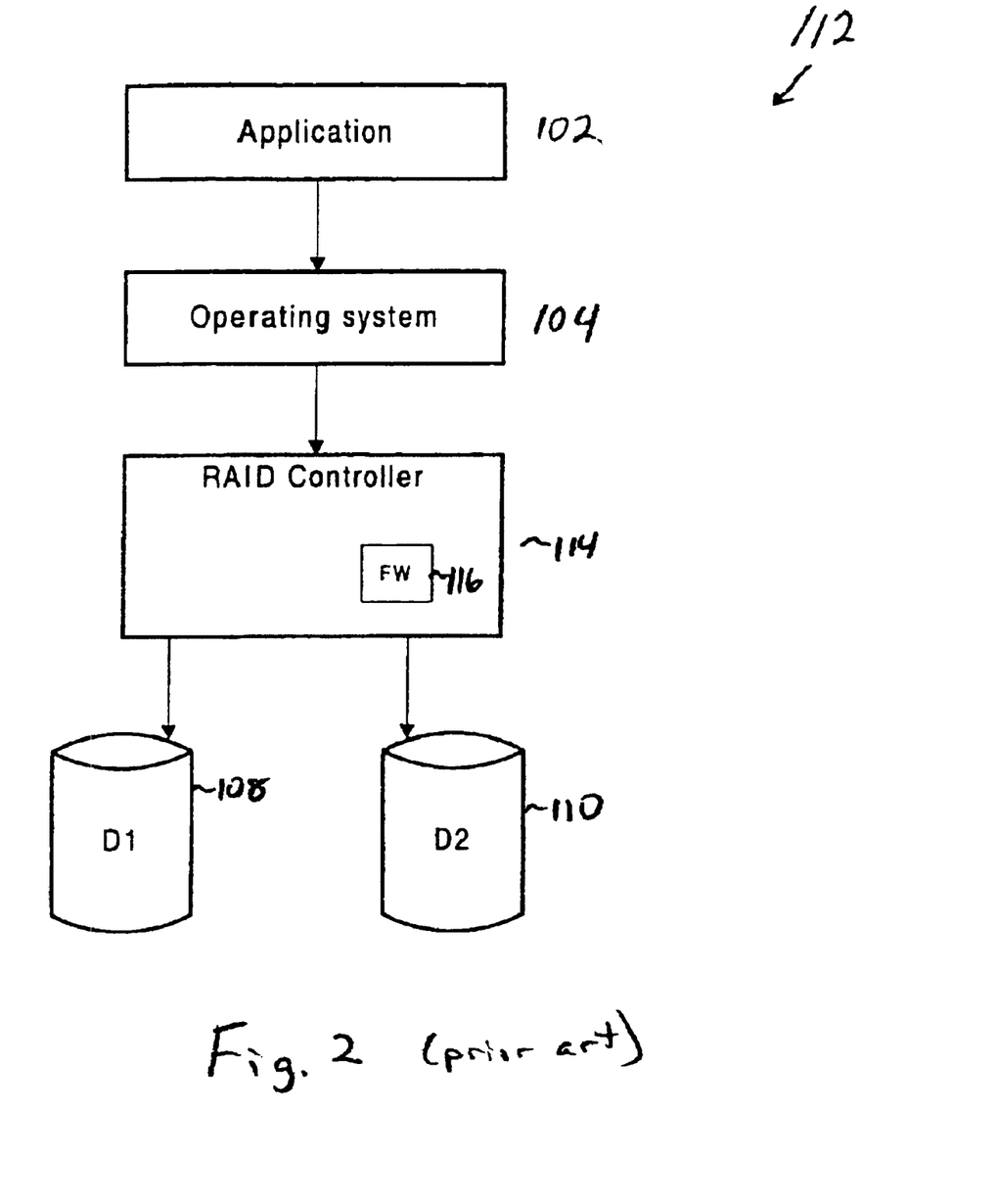
FIG. 2 illustrates a block diagram depicting how read commands are handled in the prior art for a hardware RAID implementation.

FIG. 2 illustrates block diagram 112 depicting how read commands are handled in the prior art for a hardware RAID implementation. FIG. 2 is substantially similar to FIG. 1 except that a RAID controller 114 replaces a RAID driver. The RAID controller 114 includes firmware 116 which directs the read commands to the primary drive D1 108. Similar to FIG. 1, the commands are queued in the RAM of the primary drive D1 108. Accordingly, the same bottleneck exists. Furthermore, it should be appreciated that while write commands are issued to primary drive D1 108 and secondary drive D2 110, especially in the case of RAID level 1 (mirroring), the read commands are only issued to the primary drive D1 108.

Under the configurations of FIGS. 1 and 2, the primary drive is exercised much more than the secondary drive. Therefore, the excessive wear and tear on the primary drive contributes to a higher probability of failure than the secondary drive. Consequently, a shorter mean time between failures (MTBF) is encountered for the primary drive.

Additionally, the prior art systems as described in FIGS. 1 and 2 write to both the primary and secondary drives for a RAID level 1 (mirroring) system. However, the reads are all performed through the primary drive. Accordingly, there is no built-in check to verify if the writes to the secondary drive went in correctly.

As a result, there is a need to solve the problems of the prior art to balance the read commands evenly between multiple drives to enhance performance and disk reliability.

SUMMARY OF THE INVENTION

Broadly speaking, the present invention fills these needs by providing a method and apparatus to substantially balance the load for read commands between multiple drives for a redundant array of inexpensive disks (RAID) system. It should be appreciated that the present invention can be implemented in numerous ways, including as a process, an apparatus, a system, or a device. Several inventive embodiments of the present invention are described below.

In one embodiment, a method for distributing read commands to disks associated with a RAID system is provided. The method includes establishing a first and second counter where the first counter is associated with a first disk drive and a second counter is associated with a second disk drive. Next, a command is received from an operating system. Then, it is determined if the received command is a read command. If the received command is a read command, then the first and second counters are examined to determine which of the counters is a lower value counter or if the first and second counters are of equal value. Next, a drive associated with the lower value counter is selected or if the counters are of equal value a first drive is selected. The lower value counter is then incremented or if the counters are equal the first counter is incremented. Then, the read command is directed to the drive associated with the lower value counter or the first drive if the counters are of equal value.

In another embodiment, a method for maintaining a substantially even load of read commands on multiple disk drives associated with a RAID mirroring system is provided. The method initiates with each of the multiple disk drives being associated with a counter, where the counter is configured to track a queue of read commands for a corresponding disk drive. Then, each counter is examined to identify a least loaded disk drive. Next, the counter associated with the least loaded disk drive is incremented. Then, a read command is sent to the least loaded disk drive. Next, the read command is processed in the least loaded disk drive. Then, an interrupt is generated. Next, the counter associated with the least loaded disk drive is decremented in response to the generated interrupt.

In yet another embodiment, a computer readable media having program instructions for maintaining a substantially even load of read commands on multiple disk drives associated with a RAID mirroring system is provided. The computer readable media includes program instructions for associating each of the multiple disk drives with a counter, where each counter is configured to track a queue of read commands for a corresponding disk drive. Program instructions for examining each counter to identify a least loaded disk drive and program instructions for incrementing the counter associated with the least loaded disk drive are included. The computer readable media also includes program instructions for sending a read command to the least loaded disk drive and program instructions for processing the read command in the least loaded disk drive. Program instructions for generating an interrupt and program instructions for decrementing the counter associated with the least loaded disk drive in response to the generated interrupt is also included.

In still another embodiment, an apparatus for distributing read commands between disk drives is provided. The apparatus includes a central processing unit and an operating system configured to generate commands. A first and second disk drive is provided where the first disk drive is associated with a first counter and the second disk drive is associated with a second counter. The apparatus includes a RAID driver in communication with the first and second disk drives. The RAID driver includes code for identifying a read command from the generated commands and identifying a least busy disk drive wherein the read command is sent to the least busy disk drive.

The advantages of the present invention are numerous. Most notably, the read commands become substantially balanced, thereby improving system performance. Because the system is better balanced, one drive is not dedicated to processing the read commands so that the mechanical wear of the drives is distributed more evenly. Additionally a built-in check is provided to verify that the writes to each of the multiple disk drives is being executed properly.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for distributing read commands between multiple drives. It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for proportionately distributing read commands over multiple disk drives to enhance perfor mance and disk reliability. In computer systems where multiple disk drives are employed, i.e. redundant array of inexpensive disks (RAID), the read commands are distributed among the multiple disk drives. In one embodiment, two disk drives of a RAID level 1 (mirroring) system are provided and the read commands are alternated between the two disk drives after determining which of the two drives is the least loaded drives. It should be appreciated that twice the number of read commands will be able to be processed as compared to a system where the read commands are sent to a single drive. Counters are provided for each drive to keep track of how many read commands are being processed by each drive in one embodiment. In this embodiment, prior to a read command being sent to a drive, the counters of the drives are examined to determine which counter is lower. The read command is directed to the drive associated with the lower counter. In another embodiment, the counter associated with the drive to which the read command is directed is incremented upon selection of the drive. Upon the completion of the processing of the read command, the counter is then decremented since the read command is no longer in the queue for the disk drive.

Figure 3:
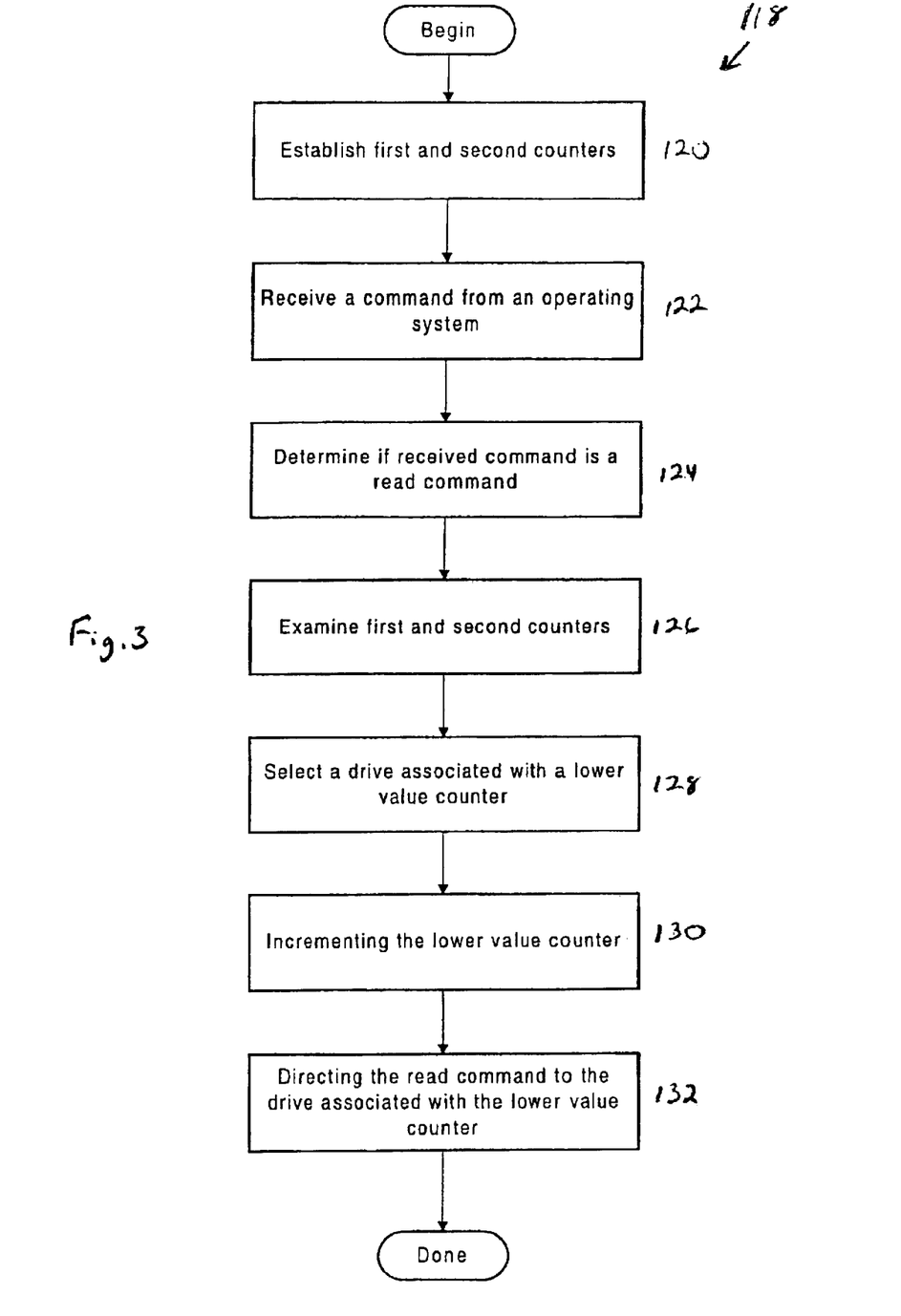
FIG. 3 illustrates a flowchart providing an overview of a method for distributing read commands across multiple drives in accordance with one embodiment of the invention.

FIG. 3 illustrates flowchart 118 providing an overview of a method for distributing read commands across multiple drives in accordance with one embodiment of the invention. Flowchart 118 initiates with operation 120 where first and second counters are established. Here, the first pending I/O counter is associated with a first disk drive and a second pending I/O counter is associated with a second disk drive. Next, the method proceeds to operation 122 where a command is received for an operating system. It should be appreciated that operating systems are constantly generating read and write commands for data resident in storage media. The method then advances to operation 124 where it is determined if the received command is a read command. In one embodiment, the operating system command such as the command descriptor block (CDB) is looked at to evaluate if the command is a read command. If the received command is a read command, then the method proceeds to operation 126 where the first and second counters are examined. In one embodiment, the counters are examined to determine which counter is a lower value counter, i.e., which counter is associated with a least loaded disk drive. For example, the counter which is associated with the least loaded disk drive will be the lower value counter. Where the counters are of equal value, the first drive is treated as the lower value counter in one embodiment of the invention. It should be appreciated that whenever the counters are of equal value one counter may be defaulted to in one embodiment of the invention.

Flowchart 118 then advances to operation 128 where a drive associated with the lower value counter is selected. For example, if the lower value counter is the first counter, then drive one is selected in operation 128. In one embodiment, if the counters are of equal value then the first drive is selected. Once the drive is elected in operation 128, the method advances to operation 130 where the lower value counter is incremented. As such, the counters keep an accurate tally of the commands for each drive so that the drives can be substantially balanced with respect to read commands. The method then proceeds to operation 132, where the read command is directed to the drive with the lower value counter. In one embodiment, the command is sent to a driver queue. In another embodiment, once the command is processed by the drive an interrupt is generated. Here, the drive from which the interrupt is generated is identified so that a pending I/O counter may be decremented.

In another embodiment, the commands are processed in a multithread environment so that multiple commands may be processed concurrently.

Figure 4:
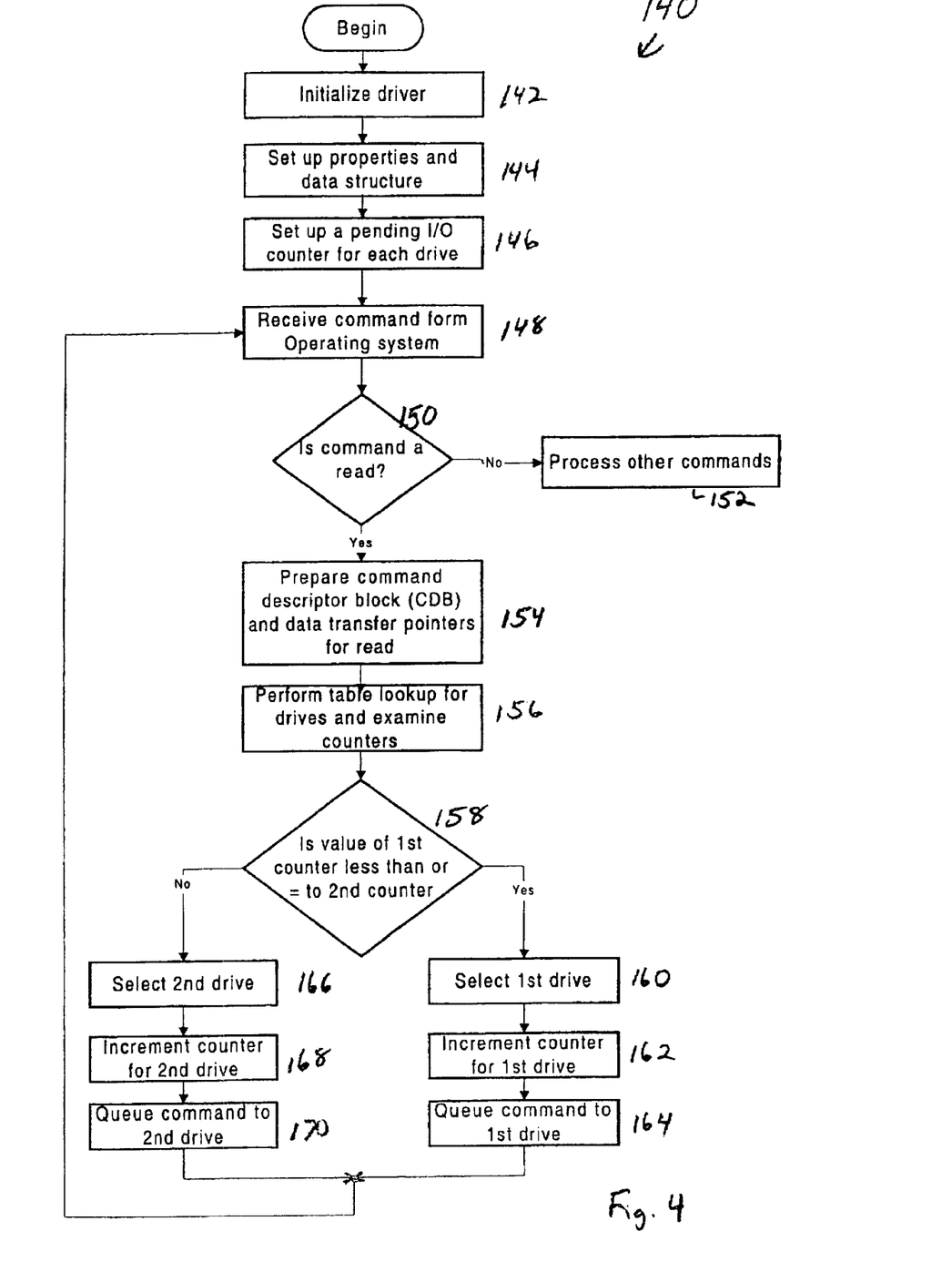
FIG. 4 illustrates a flowchart depicting a more detailed description of a method for distributing read commands across multiple drives in accordance with one embodiment of the invention.

FIG. 4 illustrates flowchart 140 depicting a more detailed description of a method for distributing read commands across multiple drives in accordance with one embodiment of the invention. Flowchart 140 initiates with operation 142 where a driver is initialized. In one embodiment the driver will recognize the number of disk drives for receiving the read commands. Next, the method proceeds to operation 144 where properties and data structure are set-up. In one embodiment the properties and data structure include the CDB, the scatter gather list and the capacity of the drive. Then, the method advances to operation 146 where a pending input/output (IO) counter is set-up for each drive. Here the counter is capable of being increased and decreased as read commands are queued and processed, respectively. In one embodiment, the driver initialization includes operations 142, 144 and 146. Upon initialization of the driver in operations 142, 144 and 146, the method advances to operation 148 where a command is received from the operating system (OS). In one embodiment, the command is received by a RAID controller or a RAID driver. Next, the received command is examined to determine whether the command is a read command in operation 150. If the command is not a read command, then the method advances to operation 152 where the received command is processed. For example, the command my be a write command and the data is written to the disks in a RAID level 1 (mirroring) implementation.

Continuing with flowchart 140, if the received command is a read command the method advances form operation 150 to operation 152 where command descriptor block (CDB) and data transfer pointers for the read are prepared. In one embodiment the CDB includes operational code, starting logical block address (LBA) and count of sectors to read. In another embodiment, the data transfer pointers include the memory location where the file is to be read. The content of the file goes to several chunks of memory. These memory chunks are pointed to by address, length, etc. contained in the scatter gather list (SGL). Next, the method proceeds to operation 156 where a table look-up for drives is performed and the counters for the drives are examined. Here, the table look-up will provide the location of the drives within the system in one embodiment. In addition, the counters are examined to determine which drive the read command will be sent to. Then, the method proceeds to operation 158 where the value of each counter is compared to determine which counter is of a lower value. It should be appreciated that the counter value reflects the load on the disk drive. For example, where the value contained in a first counter is less than the value contained in a second counter, the drive associated with the first counter is the least loaded drive. In one embodiment, where the values of the first and second counters are equal, i.e., the loads on the first and second drives are equal, the read command is sent to the first drive. It should be appreciated that where the values are equal the system can be configured to send the command to either the first or the second drive.

In one alternative, if the value of the first counter is less than or equal to the value of the second counter in operation 158, then the first drive is selected in operation 160, since the first drive is associated with the first counter. Next, the method advances to operation 162 where the first counter is incremented. Then, in operation 164 the read command is sent to the queue for the first drive.

In another alternative, if the value of the first counter is greater than the value of the second counter in operation 158, then the second drive is selected in operation 166, since the second drive is associated with the second counter. Next, the method advances to operation 168 where the second counter is incremented. Then, in operation 170 the read command is sent to the queue for the second drive.

As illustrated in FIG. 4, once operation 164 or 170 are executed the method advances to operation 148, where the above described method is repeated in one embodiment. It should be appreciated that while FIG. 4 is described with reference to two drives, the method can be applied to more than two drives. In an embodiment of more than two drives, operation 158 would compare the values of all the counters to determine which counter is lower. Accordingly, through the comparison of the counters associated with each drive, the load of the read commands will be substantially evenly distributed among the drives.

Figure 5:
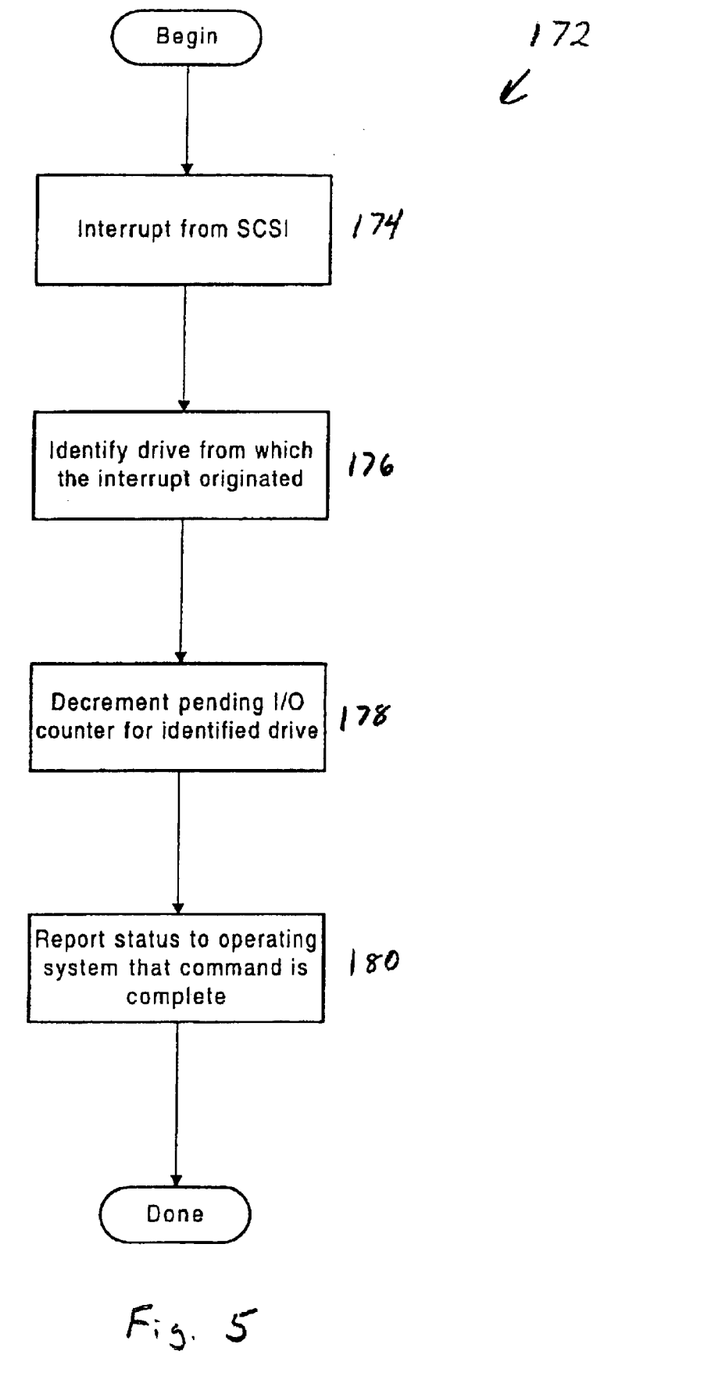
FIG. 5 illustrates a flowchart depicting a method for decrementing a counter upon the execution of a read command by a drive in accordance with one embodiment of the invention.

FIG. 5 illustrates flowchart 172 depicting a method for decrementing a counter upon the execution of a read command by a drive in accordance with one embodiment of the invention. It should be appreciated that the counters are dynamic since read commands are continually being sent by the OS and executed by the drives. In order to maintain an accurate representation of the load on each of the drives, not only do the counters have to be incremented when read commands are sent to the drive queue, the counters must also be decremented when the drive has executed the read commands as the executed commands are no longer in the queue. Flowchart 172 initiates with operation 174 where an interrupt is sent from the drive that the read command has been processed. In one embodiment, the interrupt is sent over a small computer system interface (SCSI). It should be appreciated that other interfaces such as integrated drive electronics (IDE) and AT attachment (ATA) interfaces may be used to connect the storage drives in place of the SCSI.

Flowchart 172 then advances to operation 176 where the drive from which the interrupt was generated in operation 174 is identified. It should be appreciated that where the RAID implementation is software based, the RAID driver includes the logic to identify the drive. Similarly, where the RAID implementation is hardware based the firmware of the RAID controller includes logic to identify the drive. The method then advances to operation 178 where the pending 10 counter associated with the drive that originated the interrupt is decremented. Here, since the read command has been processed, the counter is decreased accordingly so that the counter accurately represents the load on the associated drive. Then, the status of the command being complete is reported to the OS in operation 180. It should be appreciated that the method of FIGS. 4 and 5 are independent methods occurring in a multithread environment. More particularly, the incrementation and decrementation operations are independently occurring as read commands are constantly being sent by the OS in one embodiment. In other words, multiple read commands may be at various operations of the two methods at any instant of time.

It should be further appreciated that the counters i.e., logic to implement the counters, are included in a RAID driver for a software based RAID or a RAID controller for hardware based RAID in one embodiment of the invention. As described above, the method of FIGS. 4 and 5 take place in a multithread environment where multiple streams of execution takes place concurrently.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for distributing read commands to disks associated with a redundant array of inexpensive disks (RAID) mirroring system, comprising:
    establishing a first and second counter, the first counter associated with a first disk drive, the second counter associated with a second disk drive;
    receiving a command from an operating system;
    determining if the received command is a read command;
    examining the first and second counters if the received command is the read command, the examining including,
    determining which of the first and second counters is a lower value counter or if the first and second counters are of equal value;
    selecting a drive associated with the lower value counter or if the counters are of equal value selecting a first drive;
    incrementing the lower value counter or the first counter if counters are of equal value; and
    directing the read command to the drive associated with the lower value counter or the first drive if the counters are of equal value.

2. The method as recited in claim 1, further including:
    providing a multithread environment for receiving multiple commands from the operating system.

3. The method as recited in claim 1, wherein directing the read command to the drive associated with the lower value counter, includes:
    sending the read command to a drive queue of the drive associated with the lower value counter.

4. The method as recited in claim 3, wherein the drive queue holds 256 commands.

5. The method as recited in claim 1, wherein the RAID system is one of a software RAID implementation and a hardware RAID implementation.

6. The method as recited in claim 1, wherein the method operation of determining if the received command is a read command includes, evaluating a command descriptor block associated with the command.

7. A method for maintaining a substantially even load of read commands on multiple disk drives associated with a RAID mirroring system, comprising:
    associating each of the multiple disk drives with a counter, each counter being configured to track a queue of read commands for a corresponding disk drive;
    examining each counter to identify a least loaded disk drive;
    incrementing the counter associated with the least loaded disk drive;
    sending a read command to the least loaded disk drive;
    processing the read command in the least loaded disk drive;
    generating an interrupt; and
    decrementing the counter associated with the least loaded disk drive in response to the generated interrupt.

8. The method as recited in claim 7, further including:
    providing a multithread environment, the multithread environment allowing multiple read commands to be processed concurrently.

9. The method as recited in claim 7, wherein the interrupt is a small computer system interface (SCSI) interrupt.

10. The method as recited in claim 7, further including:
    reporting to an operating system that the read command has been processed.

11. A computer readable media having program instructions for maintaining a substantially even load of read commands on multiple disk drives associated with a RAID mirroring system, comprising:
    program instructions for associating each of the multiple disk drives with a counter, each counter being configured to track a queue of read commands for a corresponding disk drive;
    program instructions for examining each counter to identify a least loaded disk drive;
    program instructions for incrementing the counter associated with the least loaded disk drive;
    program instructions for sending a read command to the least loaded disk drive;
    program instructions for processing the read command in the least loaded disk drive;
    program instructions for generating an interrupt; and
    program instructions for decrementing the counter associated with the least loaded disk drive in response to the generated interrupt.

12. The computer readable media as recited in claim 11, wherein the interrupt is a small computer system interface (SCSI) interrupt.

13. The computer readable media as recited in claim 11, wherein the RAID system is one of a software RAID implementation and a hardware RAID implementation.

14. The computer readable media as recited in claim 11, further including:

program instructions for providing a multithread environment, the multithread environment allowing multiple read commands to be processed concurrently.

15. An apparatus for distributing read commands between disk drives, the apparatus comprising:

a central processing unit;

an operating system, the operating system configured to generate commands;

a first and second disk drive, wherein the first and second disk drives are mirrors of one another; and a RAID driver in communication with the first and second disk drives, the RAID driver including code for identifying a read command from the generated commands and identifying a least busy disk drive, wherein the read command is sent to the least busy disk drive, and a counter associated with the least busy disk drive, the counter being incremented in response to receiving the read command, and decremented in response to an interrupt generated upon completion of processing the read command.

16. The apparatus as recited in claim 15, wherein the RAID driver is configured to evaluate a command descriptor block.

17. The apparatus as recited in claim 15, further including:

a first and second queue, the first queue corresponding to the first disk drive the second queue corresponding to the second disk drive, the first and second queue configured to hold multiple commands.

18. The apparatus as recited in claim 15, further including:

a multithread environment, the multithread environment configured to process multiple read commands concurrently.

19. The apparatus as recited in claim 15, wherein the RAID driver is a RAID controller.

20. The apparatus as recited in claim 17, wherein the first and second queue each have a 256 command capacity.

21. An apparatus for maintaining a substantially even load of read commands on multiple disk drives associated with a RAID mirroring system, comprising:

a central processing unit;

an operating system, the operating system configured to generate commands;

a first and second disk drive, wherein each of the first and second disk drives is associated with a counter, each counter being configured to track a queue of read commands; and a RAID driver in communication with the first and second disk drives, the RAID driver including code for identifying a read command from the generated commands and identifying a least busy disk drive, wherein the read command is sent to the least busy disk drive to increment the counter of the least busy disk drive and the completion of the read command decrements the counter associated with the least busy disk drive in response to a generated interrupt.

22. The apparatus of claim 21, wherein the generated interrupt is a small computer system interface (SCSI) interrupt.

* * * * *